US008914718B2

(12) United States Patent
Denoual et al.

(10) Patent No.: US 8,914,718 B2
(45) Date of Patent: Dec. 16, 2014

(54) CODING A STRUCTURED DOCUMENT AS A BITSTREAM BY STORING IN MEMORY A REFERENCE TO AN ENTRY IN A CODING DICTIONARY

(75) Inventors: Franck Denoual, Saint Domineuc (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 1234 days.

(21) Appl. No.: 12/773,402

(22) Filed: May 4, 2010

(65) Prior Publication Data

US 2010/0287460 A1 Nov. 11, 2010

(30) Foreign Application Priority Data

May 5, 2009 (FR) ...................................... 09 52996

(51) Int. Cl.
*G06F 17/00* (2006.01)
*G06F 17/22* (2006.01)
(52) U.S. Cl.
CPC ........ *G06F 17/2247* (2013.01); *G06F 17/2258* (2013.01)
USPC ............................ 715/242; 707/693; 341/106
(58) Field of Classification Search
None
See application file for complete search history.

(56) References Cited

U.S. PATENT DOCUMENTS

| 2006/0168513 | A1* | 7/2006 | Coulson et al. | 715/513 |
| 2008/0082556 | A1 | 4/2008 | Schneider et al. | 707/100 |
| 2008/0140645 | A1 | 6/2008 | Denoual | 707/5 |
| 2008/0320031 | A1 | 12/2008 | Denoual | 707/102 |
| 2009/0106280 | A1 | 4/2009 | Natchetoi et al. | 707/101 |
| 2009/0183067 | A1 | 7/2009 | Fablet | 715/234 |
| 2009/0287625 | A1 | 11/2009 | Fablet et al. | 706/45 |
| 2010/0010995 | A1 | 1/2010 | Fablet et al. | 707/6 |
| 2010/0083101 | A1 | 4/2010 | Denoual et al. | 715/242 |
| 2010/0153837 | A1 | 6/2010 | Bellessort et al. | 715/234 |

FOREIGN PATENT DOCUMENTS

WO 2005/067153 A1 7/2005

OTHER PUBLICATIONS

Schneider, John et al.; "Efficient XML Interchange (EXI) Format 1.0" Mar. 26, 2008; W3C; 3rd working draft; pp. 1-82.*
Liefke, H., et al., "XMill: an Efficient Compressor for XML Data", Proceedings of the SIGMOD Conf. 2000, vol. 29, No. 2, New York, NY, Jun. 1, 2000.
Cannataro, M., et al., "Semantic Lossy Compression of XML Data", Proceedings of the $8_{th}$ Intl Workshop on Knowledge Representation Meets Databases, Rome, Italy, Sep. 15, 2001.
Schneider, J., et al., "Efficient XML Interchange (EXI) Format 1.0", URL:http://www.w3.org/TR/2007/WD-exi-20070716, W3C Working Draft Jul. 16, 2007 (visited Nov. 13, 2007).

* cited by examiner

*Primary Examiner* — Stephen Hong
*Assistant Examiner* — Asher Kells
(74) *Attorney, Agent, or Firm* — Fitzpatrick, Cella, Harper & Scinto

(57) ABSTRACT

The present invention concerns a method and device for coding a structured document comprising events to be coded having values.

A particular, non-exclusive, application of the present invention is the coding of the XML document as a file of the EXI type.

The method comprises the following steps:
running through the document in order to process events;
forming channels of values containing values of events according to at least one criterion;
coding the channels of values thus formed by coding the event values of each of these channels of values by means of at least one coding dictionary;
method wherein the formation device comprises, for each event to be coded and run through having a value, the association of this value to be coded with one of said channels by reference, in said channel, to an entry in the coding dictionary.

17 Claims, 8 Drawing Sheets

CODING A STRUCTURED DOCUMENT AS A BITSTREAM BY STORING IN MEMORY A REFERENCE TO AN ENTRY IN A CODING DICTIONARY

The present invention concerns a method and device for coding a structured document comprising events.

A particular, non-exclusive, application of the present invention is the coding of an XML document (the acronym for "eXtensible Markup Language") into a file of the binary XML type, for example according to the EXI (Efficient XML Interchange) recommendations.

The XML format is a syntax for defining computer languages, which makes it possible to create languages adapted to different uses, which may however be processed by the same tools.

An XML document may be composed of structured data also referred to as elements, each element being delimited by an opening tag comprising the name of the element (for example: <tag>) and a closing tag also comprising the name of the element (for example: </tag>). Each element can contain other elements in a hierarchical fashion or text data.

An element can also be specified by attributes, each attribute being defined by a name and having a value. The attributes are then placed in the opening tag of the element that they specify (for example: <attribute tag="value">).

XML syntax also makes it possible to define comments (for example: <<!--Comment-->>) and processing instructions, which can specify to a computer application which processing operations to apply to the XML document (for example: "<?myprocessing?>").

In XML terminology, all the terms "element", "attribute", "text data", "comment", "processing instruction" and "escape section" are grouped together under the generic name "item".

These XML items can be described in terms of events, also referred to as XML events. Thus an event corresponds to each part of a document. For an element <tag></tag>, there is first of all distinguished an event "start of element" corresponding to <tag> and being characterized by the name "tag", then an event "end of element" which, according to the topology of markup languages, contains a reference to the corresponding element name, here "/tag". The other most frequent events are the "character string" events for text data, "comment" for comments, or "attribute" for attributes.

For the remainder of the description, the term "event value" is given to the values that can be taken by these various events, no matter whether they are character strings, numerical values, etc.

Several different languages based on XML language may contain elements with the same name. In order to be able to mix several different languages, an addition has been made to XML syntax making it possible to define "namespaces". Two elements are identical only if they have the same name and are situated in the same namespace. A namespace is defined by a URI (the acronym for "Uniform Resource Identifier"), for example http://canon.crf.fr/xml/mylanguage". A namespace is used in an XML document by defining a prefix that is a short cut to the URI of this namespace. This prefix is defined by means of a specific attribute (for example: <<xmins:ml="http://canon.crf.fr/xml/mylanguage">> associates the prefix "ml" with the URL "http://canon.crf.fr/xml/mylanguage"). Next the namespace of an element or attribute is specified by preceding its name with the prefix associated with the namespace followed by ":" (for example: "<ml:tag ml:attribute="value">" indicates that the element tag results from the namespace ml and that the same applies for the attribute attribute).

Despite the many advantages of XML syntax, it has the principal drawback of being very prolix. Thus the size of an XML document can be several times greater than the intrinsic size of the data. This large size of the XML documents also gives rise to a long processing time when XML documents are generated and especially read.

To overcome this drawback, mechanisms for coding the content of the XML document in a more compressed form have been established.

This is in particular the case with binary XML formats such as the EXI and Fast Infoset formats, which take account of the structural information of the XML document.

For example, the EXI recommendation takes into account the order of appearance of the various events within the XML structured document in order to construct one or more grammars that can be developed and make it possible to encode the most frequent events in a small number of bits.

A grammar is composed of a set of productions, each production comprising an XML event description, a coding value associated and the indication of the following grammar to be used. To code an XML event by means of a grammar, the production containing the most precise description of the XML event is used. The coding value contained in this production is used to represent the event in the coded bit stream, and the items of information contained in the event and not described in the production are coded one after the other.

Thus, for example, it is possible to use a grammar for each element having a given name. When a child element first occurs in the content of this element, a new entry describing the type of this child element is added in the grammar with an associated index. When there are following occurrences of a similar child element, this new child element is described using the associated index.

Moreover, the information of the character string type (alphanumeric in particular) relating to the name of the items and to their values is encoded by reference to coding dictionary entries. Generally the name of an item is encoded at the first occurrence of the latter in order to form part of a production of the grammar, while the values are not integrated in the productions and are liable to differ at each new occurrence of the event.

A set of dictionaries of character strings, also referred to as coding dictionaries, is then used, comprising:

a dictionary of the URIs associating a URI with a coding index;

a dictionary of the prefixes associated with the URIs;

a dictionary of local names of the qualified names that are the elements and attributes. A qualified name is defined by a local name (the name of the element or attributes), a prefix and a URI (if the latter are used in the documents);

a dictionary of the values of the character string type, partitioned according to the qualified names to which the stored values relate.

Conventional EXI coding is carried out as the XML document to be coded is run through. Thus, traditionally, the coded items of structure and value information are interlaced according to their order of appearance in the original XML document.

In order to further improve the compression, two EXI coding modes proposing another organization of this coded information within the EXI stream generated have been established: a so-called "pre-compression" mode and a so-called "compression" mode, distinguished from each other simply by the additional use or not of a final compression algorithm, for example of the DEFLATE type, for the "compression" mode.

In these specific modes, the XML events are grouped in blocks of fixed and parametrable size, the size of the block defining the number of event values, generally the attribute values (AT) and the character string values (CH), within the block.

The EXI coding of a document is then carried out block by block, separating within these the structure information and the event value information.

The coding values of the structure information (that is to say the priority codes) with their associated content with the exception of the values of the events are grouped together in the form of a structure channel. This structure channel keeps the order and general organization of the structure of the XML document.

The values of the events of a block are for their part grouped together in the form of several value channels while keeping within a value channel the order of the values in the XML document. The value of an event is in particular placed in the value channel identified by the qualified name of the event in question or of the parent event when it is a case of a character string value (CH).

In this way similar items of information are grouped together in the same list, reducing their entropy, in order to compress them more effectively.

It will be observed that, in all the resulting value channels, the items of information relating to the events of the XML document are in a different order from their order of appearance in the XML document.

In "compression" mode, a compression of the DEFLATE type is then operated on each of the structure and value channels thus formed, with the optional establishment of strategies of grouping the channels (essentially values) according to their size (in terms of number of values).

As for the "pre-compression" mode, this performs only a reorganization of the data in blocks, as explained above.

This reorganization of the data, in the two modes, takes place to the detriment of the effective use of the memory in the EXI encoder compared with a conventional EXI encoding. This is because, apart from the storage of the dictionaries and grammars during encoding, the event values and the structure information are moreover stored so as to organize them and code them according to the channels mentioned.

FIG. 1 illustrates this situation with an XML document 10.

The EXI stream obtained for the "pre-compression" or "compression" mode corresponds to the coded information of the structure channel 11 and the coded information of the value channels 12 ordered according to the order or appearance of the qualified names in the XML document, and therefore as illustrated at 13, 14, 15, 16, and then compressed via DEFLATE (for the "compression" mode). The indices 0×00 and 0×02 of the channels 13 and 15 correspond respectively to the second occurrences of the values "2007-09-12" and "EXI", the first occurrences of which are the first (index 0) and third (index 2) values encountered in the document.

The structure information having to precede the value information, the storage aspect appears clearly in this figure. This is because the entire document (or at least the values and structure information until a number of values equal to the size of the block have been encountered) needs to be stored so as to order and in particular index the values a posteriori according to the order defined by the EXI specification.

As a result, compared with conventional EXI encoding, there is an addition memory requirement for storing these channels. The use of these two encoding modes in equipment with limited resources, such as mobile telephones or photographic apparatus, may be called into question for lack of onboard memory.

It is however possible to act on the block size parameter in order to control the use of the memory resources of the equipment. However, this parameter gives only the number of event values to be taken into account. It does not reflect the number of bytes actually used in memory for storing the coding values, all the more so since the size (in bytes) of the values within the same XML document may vary greatly: this is because the values are character strings the length of which varies. Thus this block size parameter proves tricky to adjust.

There is also known, from the application US 2008/082556, use of decomposition in the form of channels. The coding and compression method described uses information a priori to represent, in finite automatic controller form, the structure of the XML document to be compressed. All the information of the document is encoded in the form of coding values, which are then separated into different sub-streams of metadata or values, according to the criteria chosen.

This method also has the drawback of requiring a large memory space since the coding values of the whole of the document are first of all stored before being distributed in sub-streams. In addition, because of this integral storage before distribution, coding/compression on the fly cannot be carried out.

The solutions of the prior art thus have the major drawback of using a large amount of memory space.

The present invention aims to solve at least one of the drawbacks of the prior art by proposing in particular a more effective use of the memory. Implementation of the invention on equipment with limited resources is thus facilitated thereby.

To this end, the invention relates in particular to a method of coding a structured document comprising events to be coded having values, comprising the following steps:

running through the document in order to process events;

forming channels of values grouping together event values according to at least one criterion, coding the channels of values thus formed by coding the event values of each of these channels of values by means of at least one coding dictionary;

method in which the formation steps comprises, for each event to be coded and run through having a value, the association of this value to be coded with one of said channels of values by reference, in said channel of values, to an entry in the coding dictionary.

By using references to the coding dictionary to form the channels, storage of the event values is dispensed with before the channels are formed. In particular, only one instance of each value is stored at the dictionary rather than a plurality of occurrences of this value in the channels of values. The memory resources consumed are therefore less.

The referenced entry is then the one corresponding to the value to be coded, in the dictionary.

Moreover, according to the invention, the channels of values are progressively formed as the document is run through, which allows easier processing on the fly and accelerated coding by blocks. In addition, this progressive coding by blocks offers an effective means for controlling the use of the memory that the decoder would do at the same stage of processing of the XML document. It is thus possible to stop a block when the supposed use of the decoder memory is optimal.

Finally, the use of references to the dictionary transfers the entry searches, in the dictionary, during the formation step rather than during the actual coding operations. As this may require significant resources, the method of the invention thus makes it possible to distribute the processing load and for example to use equipment provided with fewer resources.

In one embodiment, the formation step comprises, prior to said association, a step of adding, in the coding dictionary, an entry corresponding to said value to be coded if the latter is not already there. Compatibility with the EXI format is thus preserved since the dictionaries are open to development. The association is then performed on this new entry.

In particular, the new added entry is partial in that it does not include, when it is added, the coding index calculated for the coding of the corresponding value. In particular, at least one coding index associated with the entry can then be calculated during the step of coding the channels of values. By moving these index calculations when the channels and values are run through for coding thereof, the formation of the channels of the values is made more rapid.

In particular the at least one coding index of a newly added entry takes a first particular value at the time of this addition. This first particular value indicates that the subsequent occurrences of this same value will be coded by means of an index.

Unlike the known technique such as the EXI recommendation where the index in the dictionary take the value of a counter indicating the current number of different values in the dictionary, here the coding indices take the same particular value when a new entry is inserted. The calculation of the coding index is transferred subsequently.

Advantage is taken of the latter particularity in order, as will be seen subsequently and by virtue of the use of this first particular value, to easily identify the entries not processed during the coding of the channels of values in order to obtain the final EXI stream.

In particular, the coding of the channels of values to generate at least one coded stream comprises:

running through said channels of values so as to recover, in said coding dictionary, a coding index for each value to be coded, by means of said reference;

replacing, in said coding dictionary, the at least one coding index associated with a reference run through, with a current index value, when this at least one coding index is equal to said first particular value.

Thus the coding indices are determined only once when the final coded stream is generated, taking account of the re-sequencing of the values because of the formation of the channels of values.

According to a particular feature, the at least one coding index comprises a local coding index corresponding to a local partition associated with a channel of values and a global coding index. The use of the partitions makes it possible to obtain local coding indices in a smaller number of bits than the global indices. Thus a contextual coding by means of the local indices makes it possible to obtain a more compressed coded stream.

In a particular embodiment, the global index of an entry in the dictionary is replaced by the value of a global index counter that is incremented at each new reference run through, the associated entry of which comprises a global index equal to the first particular value.

Similarly, the local index of an entry in the dictionary is replaced by the value of a local index counter that is zeroed at each new channel of values run through and incremented at each new reference run through in this channel of values, the associated entry of which comprises a global index equal to the first particular value.

These two provisions make it possible, when references making up the channels of values are run through, to effectively generate the coding values (local and global) associated with each of the entries in the dictionary, taking account of the re-sequencing because of the formation of the channels. The use of one or other of the two indices is explained below.

In one embodiment, an entry in the coding dictionary also comprises a coded value corresponding to the literal coding of said value associated with this entry, and said coded value is deleted from said dictionary during the coding, by means of said coded value, of the event value associated with said reference run through. The use of the value coded literally generally concerns the first occurrence of a value. This provision makes it possible to progressively free the memory of the encoder during the coding of the document since the subsequent occurrences of the value are then coded by the coding index in the memory of the dictionary rather than the value coded literally. This freed space can in particular serve to store the coded file.

In one embodiment, the at least one coding index of a newly added entry takes a second particular value during this addition, so as to indicate that the subsequent occurrences of the event value of the event are not encoded by means of an index.

The coding index can then take at least two values when the entry is added in the dictionary: the first or second particular value.

This provision makes it possible, when the coded stream is generated, to easily identify when an index must not be generated and/or used for coding a value of one of the channels of values. This may be the case for very long and infrequent values. In this case, it is actually preferred to code the value at each occurrence rather than to keep it in the dictionary, which is expensive in terms of memory on decoding.

In particular, the step of coding the channels of values comprises the addition of a predetermined value to at least one coding index of the entry associated with a reference of a channel of values to be coded, when this entry initially comprises a coding index equal to the second particular value, and the deletion, in the coding dictionary, of this entry, when this coding index becomes equal to the first value.

Unnecessarily using the memory of the system with entries in the dictionary not used for coding is thus avoided: when the coder detects that this value will no longer be used, it deletes it from its dictionary of values in order to recover memory resources.

In one embodiment of the invention, said channels of values are formed by grouping event values according to the qualified name of the event associated with them. These groupings make it possible to obtain channels of values having lower entropy and therefore to obtain better compression thereof. In this way compatibility with the EXI format is also preserved.

According to a particular feature, there is chosen, as an encoding index of an event value referenced in a channel to be coded, a local coding index of the entry associated with the value of the event when the qualified name associated with said channel is the qualified name associated with said event; and a global coding index is chosen if these qualified names differ. In this way, use is made of a simple criterion to be used for improving the compression of the coded stream utilizing the local indices, established in a smaller number of bits than the global indices.

In addition, provision is made for the encoding index to be supplemented with marking information saying whether it results from the global index or the local index. This provision enables the decoder to effectively decode the coded stream received.

In other words, this means that the occurrence is encoded of an event value referenced in a channel of values, by means of a global index associated with all the channels of values when said occurrence does not belong to the same channel of values as the first occurrence of said value; and by means of a local index associated solely with said channel of values in the other case.

In one embodiment of the invention, said channels of values are created as said document is run through, keeping their order of creation.

Thus the coder does not need to maintain the order of appearance of the qualified names in the document for the purpose of sorting the channels of values when they are encoded. The result is a saving in memory consumption, as well as a more rapid coding in the absence of subsequent sorting.

In particular, prior to said running through of the channels of values, channels among the plurality of the channels of values are recombined according to at least one criterion so as to obtain at least one recombined channel of values.

This configuration optimizes the compression of the coding values.

According to a particular characteristic, the channels of values are coded successively in said order of creation, said at least one recombined channel of values, when such exists, being coded in advance. In this way compatibility with the EXI recommendation is preserved.

In another embodiment of the invention, the method comprises, for each association of a value with a channel of values, the following steps:
estimating a number of bits necessary for coding said event value;
increasing a bit counter by said estimated number of bits;
using said bit counter to divide said structured document into a plurality of data blocks to be coded separately.

The number of bits necessary is typically that necessary for the representation of the coding index or the representation of the coding value when a value to be coded first occurs. In particular, the number of bits estimated is equal to the number of bits necessary for representing the number, increased by one, of entries in said coding dictionary. This provision allows an estimation at almost zero cost of the memory occupation that the decoder will have at the same stage of the processing. This is because generally the coding index is the lowest number available.

In a variant, the estimation of the number of bits necessary for representing the coded value associated with the value to be coded is applicable to the first occurrence since in this case the coded value and not yet the coding indices is encoded, or the values to be coded that are not indexable.

According to a particular characteristic, the formation of the channels of values is stopped and they are coded when said bit counter reaches a predefined value so as to generate at least one coded stream corresponding to a part of the document.

This makes it possible to send a stream portion the size of which is compatible with a buffer size of the decoder so that the latter can decode on the fly the stream thus coded. This stream portion is thus processed as a block as defined for the "compression" and "pre-compression" options of EXI. The coded block is therefore directly decodable.

In particular, the generation of at least one coded stream is iterated according to the predefined value, in order to code a plurality of successive parts of the structured document.

According to these provisions, the use of the memory is easily controlled. The structured document is encoded by blocks of events of variable size, where each block results from the reaching of the predefined value by the counter at each iteration. The decoding of each block will for its part not require memory beyond the predefined value, which is therefore chosen according to the capacities of the decoder provided. In addition, the blocks become adaptable to the content of the document.

The invention also relates to a device for coding a structured document comprising events to be coded having values, comprising:
a means able to run through the document in order to process events;
a means for forming channels of values grouping together event values according to at least one criterion;
a means of coding channels of values thus formed by coding the event values of each of these channels of values by means of at least one coding dictionary;
device in which said formation means is able to associate, for each event to be coded and run through having a value, this value to be coded with one of said channels of values by reference, in said channel of values, to an entry in the coding dictionary.

The reference can be implemented by means of computer links, such as pointers to the corresponding entry in the dictionary.

The device has advantages similar to those of the method disclosed above, in particular the reduced use of its memory resources.

Optionally, the device can comprise means relating to the features of the coding method disclosed previously.

The invention also concerns an information storage means, possible totally or partially removable, able to be read by a computer system, comprising instructions for a computer program adapted to implement the coding method according to the invention when this program is loaded into and executed by the computer system.

The invention also concerns a computer program product able to be read by a microprocessor, comprising portions of software code adapted to implement the coding method according to the invention, when it is loaded into and executed by the microprocessor.

The information storage means and computer program have features and advantages similar to the methods that they implement.

Other particularities and advantages of the invention will also emerge in the following description, illustrated by the accompanying drawings, in which.

Figure 1:
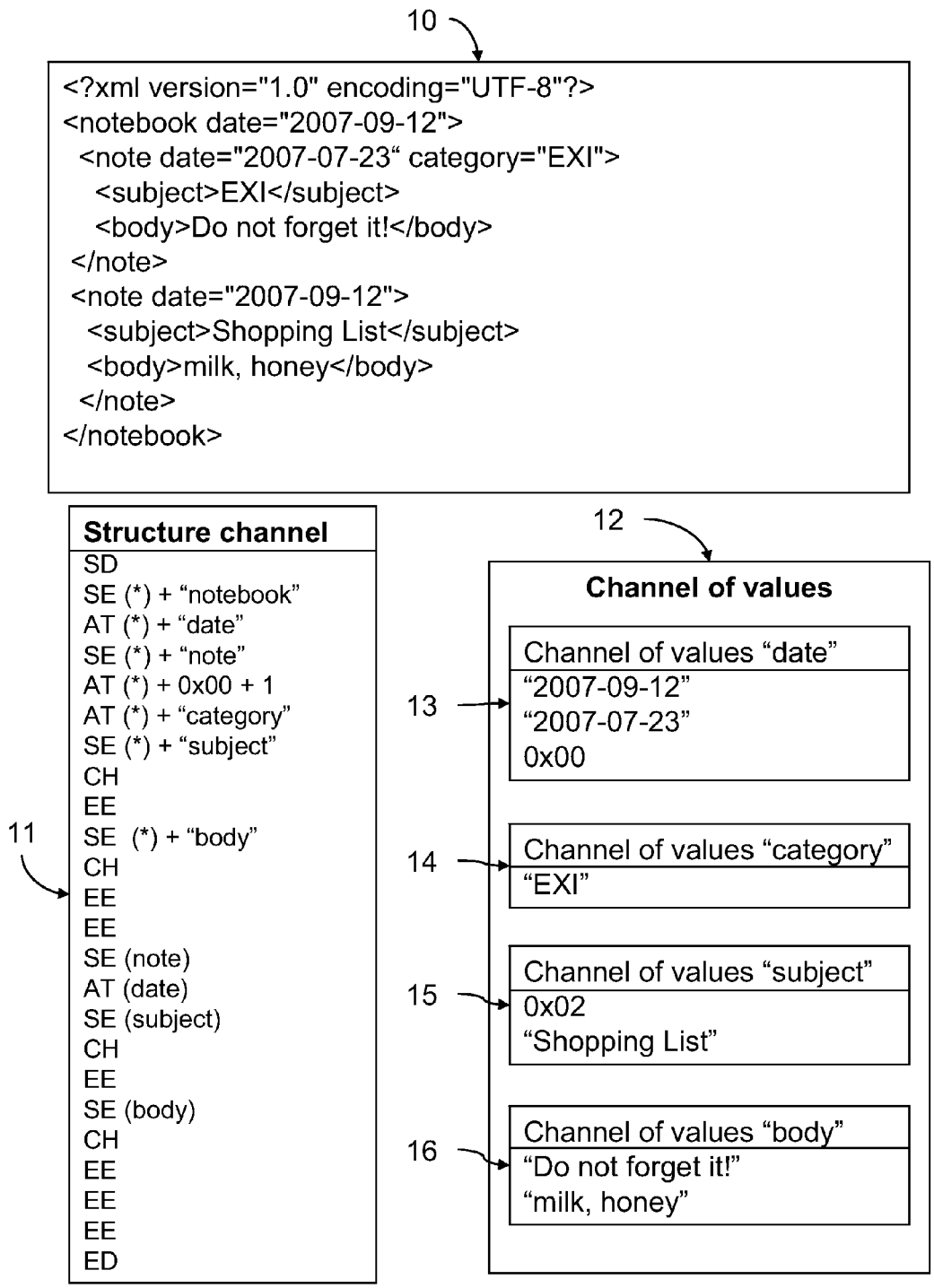
FIG. 1 represents an XML file and structure and value channels in accordance with the EXI specification.
Figure 2:
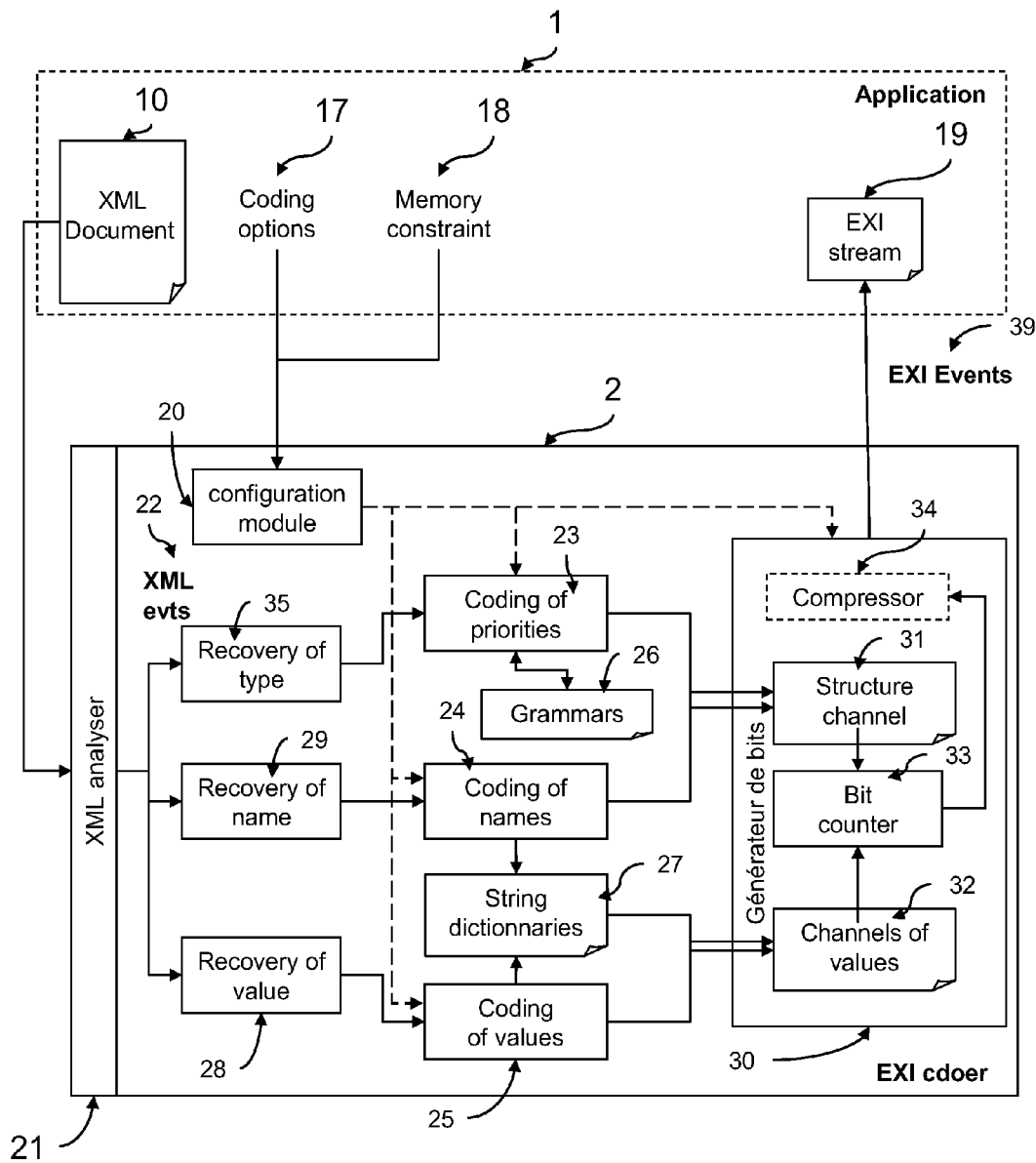
FIG. 2 shows an EXI coder 2 for implementing the invention, activated by a user from an application 1 offering a user interface.

The coder 2 takes as an input an XML document 10 to be coded according to any coding options 17 that the user has specified. Such a coding option can in particular consist of the choice of one of the "pre-compression" or "compression" modes.

The user can also indicate, via the user interface, a memory constraint 18, which the coder 2 uses for forming the coding blocks as described below. This memory constraint specifies in particular a memory limit available at a decoder for the EXI stream compressed according to the invention. This limit is in particular due to the fact that the decoder is used on a mobile terminal of small memory capacity. This block size can also be supplied by a device for putting the EXI information in packets with a view to exchange it via a specific network communication protocol.

The XML document 10 is run through by the coder 2 in a conventional fashion by means of an XML syntactic analyzer 21 that progressively extracts the information in the form of XML events 22. Any coding options 17 are processed by the configuration module 20, which transfers them to the various coding modules 23 (coding of priorities), 24 (coding of names) and 25 (coding of values) in order to parameterize these according to the values of these options. These various coding modules use data "type of event", "qualified event name" and "event value" recovered from the analyzer 21 respectively by the type recovery module 35, the name recovery modules 29 and the value recovery module 28.

For example, the priority coder 23 codes either all the types of XML events, or a subpart of these, according to the values of the preservation options.

The EXI coder 2 in the end produces an EXI stream 19 generated by its bit generator 30. This bit generator 30 is also configured by the configuration module 20, in particular with regard to the options of alignment ("byte-aligned"), compression, block size, indexing conditions and memory constraint 18 to be complied with.

For example, if the alignment mode indicated in the coding options 17 corresponds to the "pre-compression" mode, the bit generator 30 organizes the information according to the structure and value channels before coding them and sending them in the form of EXI events 39 to the application 1.

For this purpose, the bit generator 30 contains a structure channel 31 that makes it possible to store the priority codes and the names of elements and attributes defining the structure of the XML document 10, and channels of values 32 for storing the various values of the XML events of the text type or the attribute values.

These values are those recovered at the analyzer 21, by the value recovery module 28. To generate the EXI stream, these values are then coded by the module 25 by means of the character string dictionaries or coding dictionaries 27.

The sizes of the items of information thus stored during the coding are counted by the bit counter 33, which makes it possible to know whether the counter has reached the memory constraint 18 fixed by the application 1.

The invention is concerned in particular with optimized management of the memory used by the coder during coding of the XML document 10, in particular the memory space used for storing the coding dictionaries 27 and the channels of values 32. The invention is also concerned, in some aspects, with optimizing the decomposition of the XML document 10 into blocks so as to comply with the memory constraints relating for example to the decoder. The result is blocks of variable size in terms of numbers of event values, which differs from the solutions of the prior art.

With reference to FIGS. 3 to 7, a description is now given of the formation of the streams compressed according the method of the invention and compatible with the EXI specification.

Figure 3:
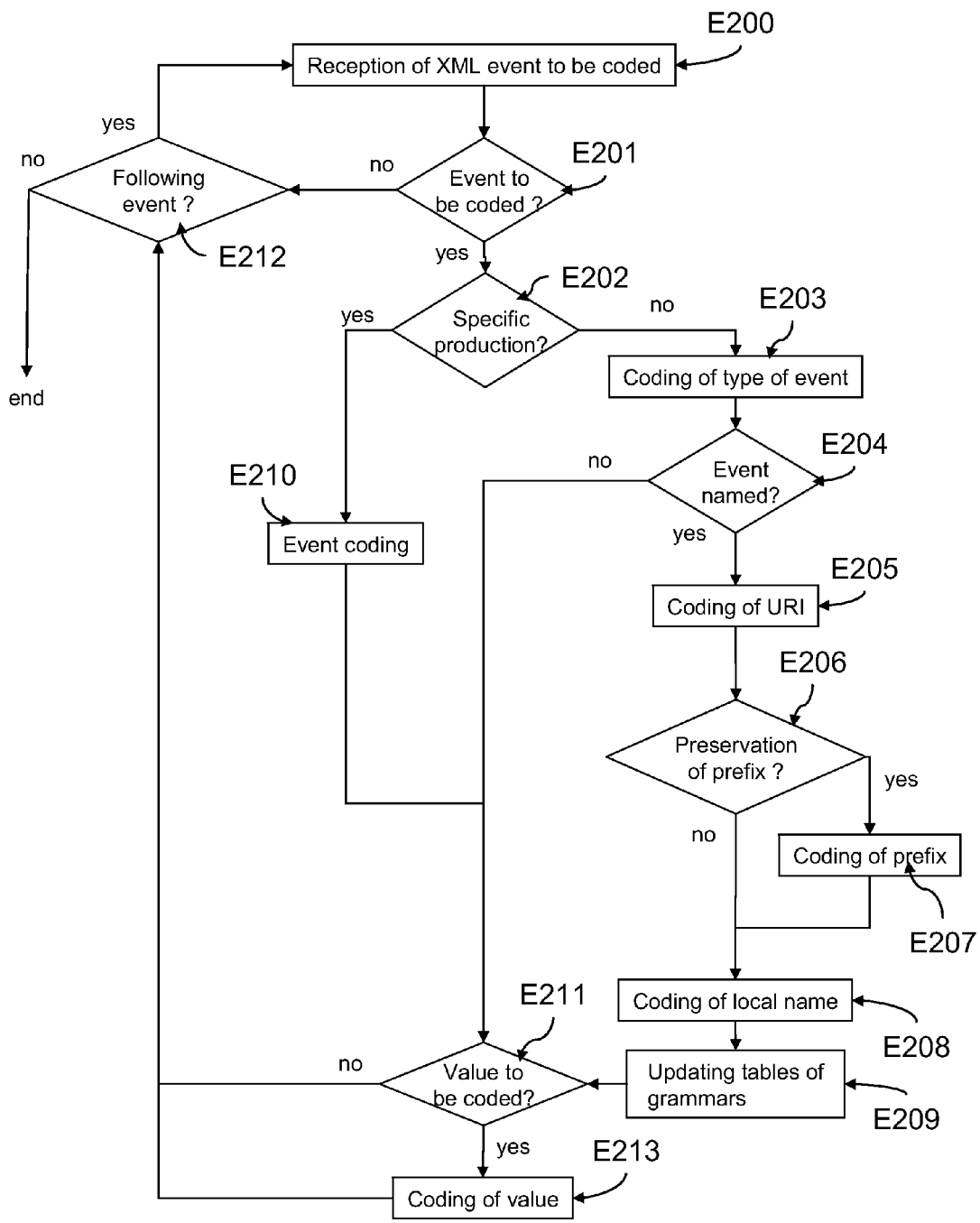
FIG. 3 illustrates, in the form of a logic diagram, steps of coding according to the invention an XML document according to the EXI format in "pre-compression" or "compression" mode specified in the coding options.

FIG. 3 shows, in the form of a logic diagram, steps of coding according to the invention an XML document 10 according to the EXI format in pre-compression or compression mode specified in the coding options 17.

This process begins with a step E200 of receiving an XML event to be coded at the analyzer 21. The sequence will be illustrated by means of the attribute event <<date="2007-09-12">> in FIG. 1.

At step E201, it is tested whether or not this event is to be coded. The result depends on the coding options 17 chosen at the application 1.

If the event is to be coded, the coding of the structure information (steps E202 to E210) and then the coding of the event values if any (steps E211, E213) are carried out successively. The present invention concentrates on the latter coding. At step E202, the priority coder 23 checks whether there exists in the current grammar a specific production for representing the current event, the type of module 35 of which it recovered. For illustrative purposes only, according the EXI notation, it is possible to seek a production of type SE(qname) or AT(qname) or CH with a code of length 1, where qname is the qualified name of the current event. In our example, a production AT(date) is sought.

If no production is found, the type of event is coded, at step E203, using a generic production (type AT(*)) of the current grammar.

Then, if it is a case of an event having a qualified name (test at step E204, in our example "date"), the value of its URI is coded at E205 by the name code of 25, and then that of its prefix or prefixes at E207 if these are to be kept (test at step E206).

In the event of test E206 false and following step E207, the local name, "date" in our example, is recovered from the module 29 and then coded by the name code of 24 during step E208.

All these items of information are stored one after the other in the structure channel 31 of the bit generator 30, as can be seen in the third line of the channel 11, FIG. 1.

The following step E209 consists, for the priority coder 23, of updating the table of grammars 26 by adding a specific production (AT(date)) and/or creating a new grammar in accordance with the EXI specification for each new start of element (SE). Each data item written in the structure channel between steps E202 and E209 contributes to incrementing the bit counter 33 by as many bits as is necessary for representing each of the priorities used and the coded qualified names.

In the case of a positive test E202, where a specific production AT(date) has been found, the XML event is then uniquely coded, during step E210, by means of the priority code associated with the production found. In our example, it is the case for the second occurrence of <<date="2007-09-12">>, producing line 15 of the channel 11.

The bit counter 33 is then increased by the binary length of this priority.

Following the coding of the structure information, the analysis of the current XML event by the value recoverer 28 makes it possible, during the test E211, to determine whether an event value is to be coded. In our example, the value "2007-09-12" is to be coded.

If such is not the case, the coding continues by considering the following event in the XML document at E212.

Otherwise this event value is coded by the value coder 25 during step E213, which is described below with reference to FIG. 4. The following event is then considered at step E212.

Figure 4:
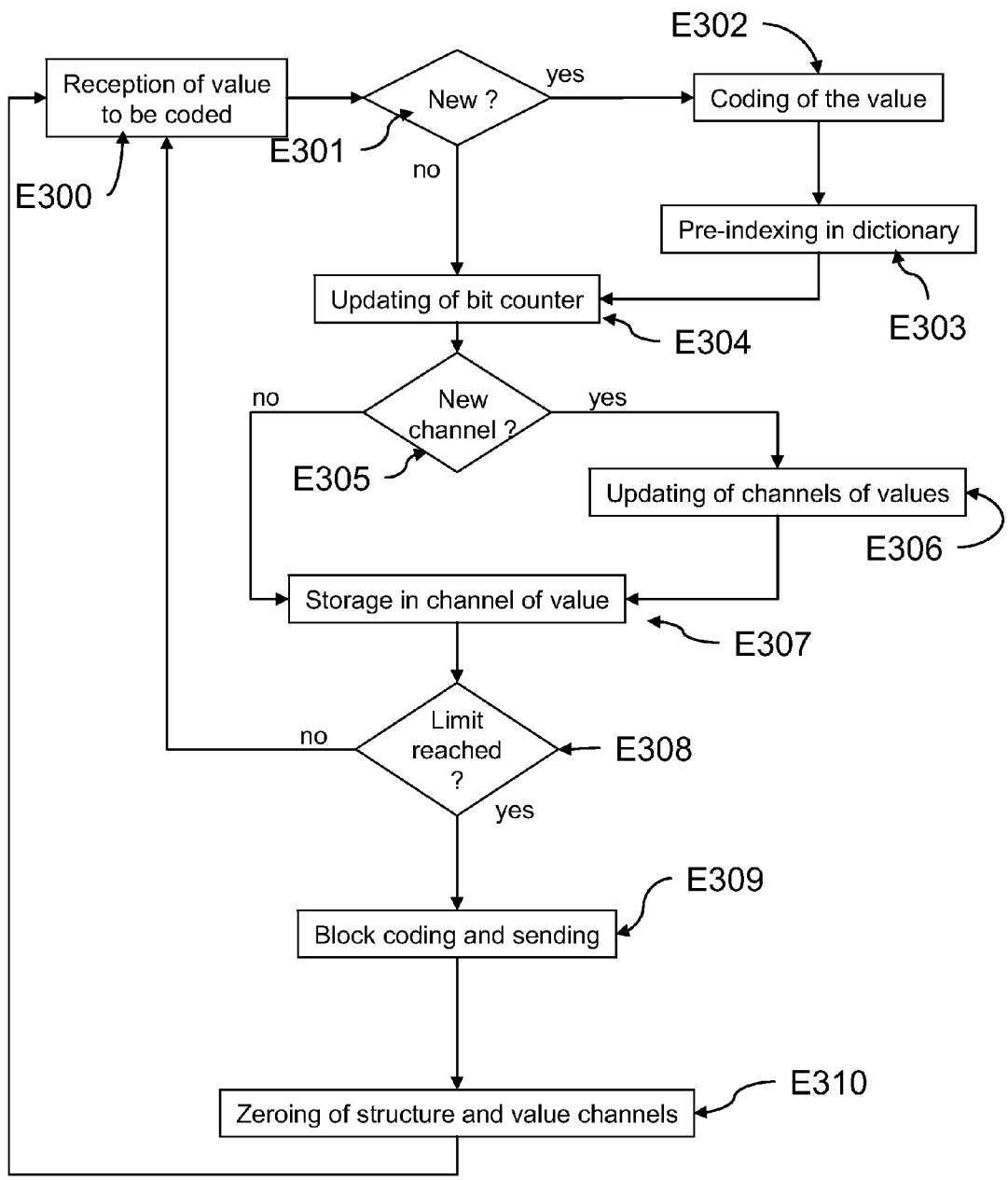
FIG. 4 shows, in the form of a logic diagram, steps of coding an event value according to the invention.

FIG. 4 shows, in the form of a logic diagram, steps of coding an event value according to the invention.

At step E300, the value coder 25 receives an XML event value to be coded, corresponding to the output value "yes" of step E211.

The test E301 at the value coder 25 checks whether this value to be coded is new or whether it is already present in the or one of the coding dictionaries 27.

This step ensures that a single occurrence is stored by the event value, thus limiting the memory consumption of the EXI coder 2.

If this value is new (first occurrence of "2007-09-12" for example), this event value is coded literally at E302 according to the EXI specification.

Next this value is pre-indexed in the coding dictionary 27 during step E303.

This dictionary 27 is for example used in the form of a hash table that associates, with a given value, a particular input. This input is defined both in the partitioning of global values (representing all the dictionary) and in a partitioning of local values (associated with a qualified name "Qname") defined by the EXI specification.

Figure 5:
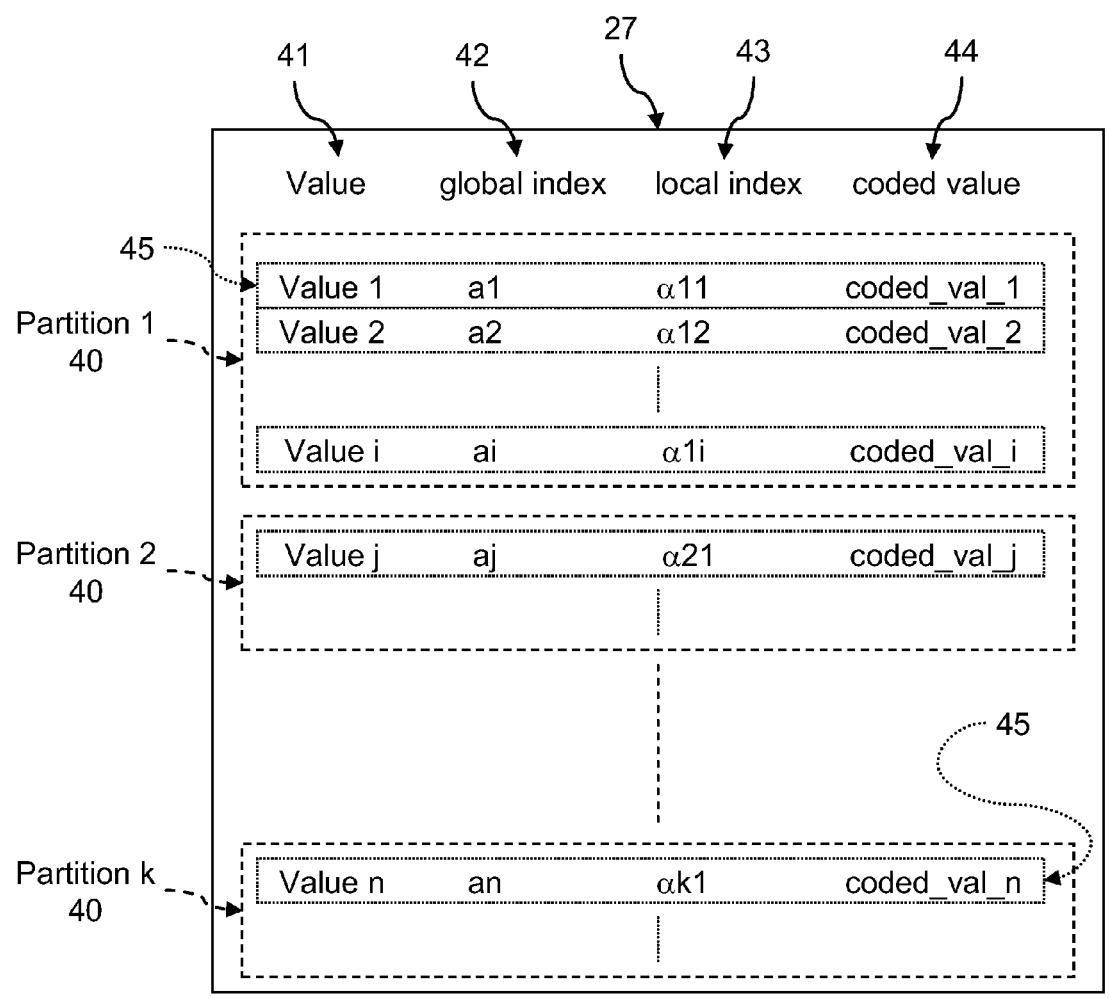
FIG. 5 illustrates a character string dictionary for the coding according to the invention.

As illustrated in FIG. 5, the coding dictionary 27 therefore comprises partitionings 40 of values 41, each so-called "local" partitioning 40 being associated with a qualified name. With each input 45 corresponding to a value 41 there are associated a global partitioning index (global index 42), a local partitioning index (local index 43) particular to the partitioning 40 with which the input in question belongs and, optionally, its coded value 44 calculated at step E302.

The local index 43 relates to the local partitioning of values 40, which makes it possible to represent, effectively in terms of access and inexpensive in terms of memory, the input index in question.

The search step E301 makes it possible to preserve, for another occurrence of the event value, a link to the input of the dictionary corresponding to this same value.

The pre-indexing of step E303 consists of creating a new input 45 in the dictionary 27 for the event value in question, and setting the global index 42 of this new input to "−1" if the string is indexable, to "−2" otherwise.

The local index 43 is determined in accordance with the EXI specification, that is to say it corresponds to the preceding local index 43 in the same partitioning 40 "+1". Thus the local indices within the same partitioning 40 are progressively incremented, from 0. In a variant, this local index 43 can also be set to "−1" when the corresponding input is added and calculated during step E459 as described below.

Following the insertion E303 or following the identification of an input in the coding dictionary 27 (output "no" of step E301), the bit counter 33 is respectively incremented, at step E304, by the number of bytes corresponding to the size of the coded value 44 when it is a first occurrence (new input in the table) or a non-indexable value, or by the number of bytes necessary for the representation of the size of the dictionary of values 27 plus 1, for the indexable subsequent occurrences.

The latter case makes it possible to estimate the size of the coded value by reference to an input of the dictionary, and therefore the number of bits necessary for representing the index to be used for coding the value. The direct advantage is that the estimation of the size in bytes of the current coded block is made at an almost zero cost.

The method continues with the conformation of channels of values. As will be seen below, the invention provides one channel per qualified name, and therefore the values are grouped together in the same channel of values according to the criterion of belonging to the same qualified name.

In order to optimize the reorganization of the values according to the qualified name to which they are attached, the value coder 25 recovers from the name coder 24 the qualified name ("date" in our example) relating to the coded value at E302 and checks whether a value channel already exists for this qualified name at E305.

If no value channel corresponds (this is the case during the first occurrence of the attribute "date" in the XML document), the value coder 25 indicates, at E306, to the bit generator 30 that it should update its list of value channels with a new channel associated with this qualified name. In our example, this corresponds to the creation of the channel 13 (empty at this time).

By virtue of this step E306, the channels of values are ordered as soon as they are created. This avoids the coder 2 maintaining the order of appearance of the qualified names and, at the time of coding of the block, running through all the value channels in order to sort them according to this order of appearance, as is the case in the solutions of the prior art.

A gain in memory consumption is thus obtained, and also a speed of coding since sorting is no longer necessary.

Following step E306 or if a channel associated with the qualified name of the value to be coded is present ("no" at the output of the test E305, for example for the second occurrence of an attribute "date" in the XML document 10 of FIG. 1), the value coder 25 inserts (step E307) in the new channel of values or the one already existing, a link (or a reference) to the input 45 of the dictionary 27 associated with the value to be coded. This is the input found during the search in the dictionary of values 27 at E301 or newly created during steps E302 and E303. This link can take the form of a pointer to said input 45 of the dictionary 27.

Contrary to what it was possible to do in the known solutions of the prior art, the invention does not directly store the event values to be coded but simple references to the entries in the dictionary corresponding to these values.

This formation of the channels with reference to the entries in the dictionary, rather than storing the value itself, avoids the multiple storage of the same value and therefore offers a more effective memory management as well as increased precision in the estimation of the size of the coding block.

In addition, this reference or link gives access immediately to the coding index (local or global) in the dictionary without carrying our any additional search other than the verification of step E301.

On leaving step E307, it is checked, at step E308, whether the bit counter 33 has reached the predefined limit value fixed by the application 1 via the memory constraint 18.

If such is not the case, the value coder 25 awaits a new value to be coded at E300, which corresponds to the end of step E213 of FIG. 3, which is continued by the search for a following event to be coded at E212.

If the test of step E308 indicates on the other hand that the memory constraint is reached, running through the XML document is suspended in order to generate a portion of the final coded EXI stream from the channels generated at this moment. It is thus seen that a block is formed that does not necessarily contain the same number of events and XML values on each occasion. The block is therefore of variable size with regard to the number of XML events and adapted according to the memory constraint 18 fixed.

Thus the bit generator 30 proceeds with the construction of the block by assembling the structure and value channels. It is the object of the step of coding the channels of values E309 that is described below in relation to FIGS. 6 and 7 in order to result in the obtaining of the portion of EXI stream either "pre-compressed" or "compressed", corresponding to the portion of the XML document run through.

Step E309 is followed by the resetting to zero of all the structure channels 31 and value channels 32 during step E310, with a view to the coding of the following block (looping onto step E300). Thus the generation of coded blocks whose size is less than a predefined limit value is iterated.

Figure 6A:
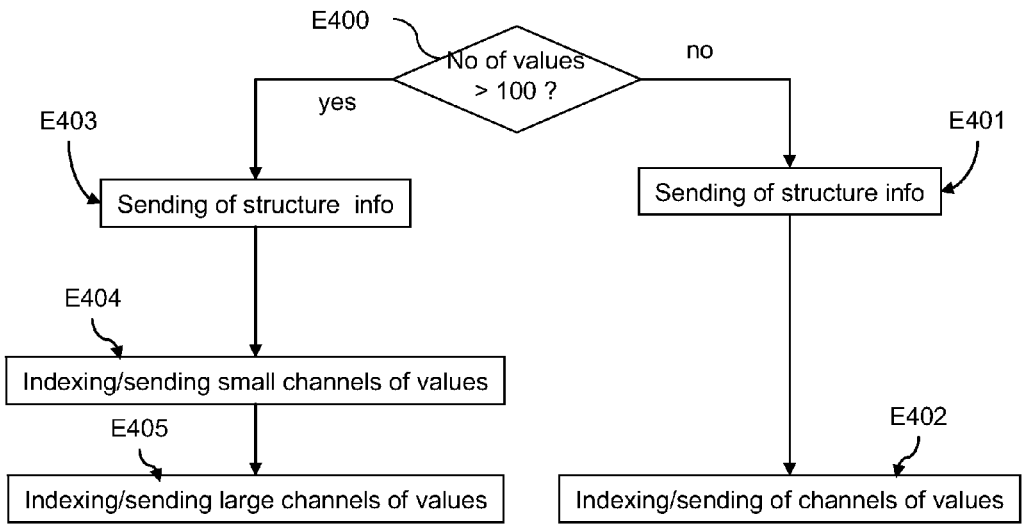
FIGS. 6a and 6b illustrate, in the form of logic diagrams, steps for the coding, in "pre-compression" mode, of a block constructed according to the teachings of the invention.

FIG. 6a shows, in the form of a logic diagram, steps for the coding, in "pre-compression" mode, of a block constructed according to the teachings of the invention.

If the number of coded values for the block is less than 100 (test E400), which is the limit number of values coded by the block according to the EXI specification, a single compressed stream is constructed, which successively contains the information of the structure channel (E401) concatenated with the values referenced in the channels of values 32, taking the channels one after the other in the order of their formation.

The values referenced in the value channels 32 having been pre-indexed during step E303, they must be indexed according to the order of channels of values 32. This indexing, the object of step E402, is described with reference to FIG. 6b below.

As soon as indexed, the values are inserted in the compressed stream 19 following the other previously indexed values, and then the whole is sent to the application 1 during this same step E402.

If the number of coded values for the block is greater than 100 (output yes of tests E400), the information of the structure channel 31 is first of all sent (step E403) in a similar fashion to step E401.

In this embodiment, the order of sending of the values is generally different from the order of the channels of values 32 because of recombinations as explained below. This has an influence on the indexing of the coded values. In this case, the indexing thereof takes place as follows.

A first pass on the channels of values 32, at E404, identifies all the channels having less than 100 values, and then reassembles the values of these channels in the same compressed stream. The values referenced in this "recombined" channel are then indexed (coded) and then the channel is sent immediately after the structure channel 31.

For this, for each value channel 32 having less than 100 values, the bit generator 30 runs through the list of links to the inputs of the dictionary 27 as described below in relation to FIG. 6b.

The second pass next consists of considering at E405 the channels of values 32 having more than 100 values. For each of these channels, the bit generator 30 creates a compressed stream according to the steps of FIG. 6b. The streams are then sent.

Figure 6B:
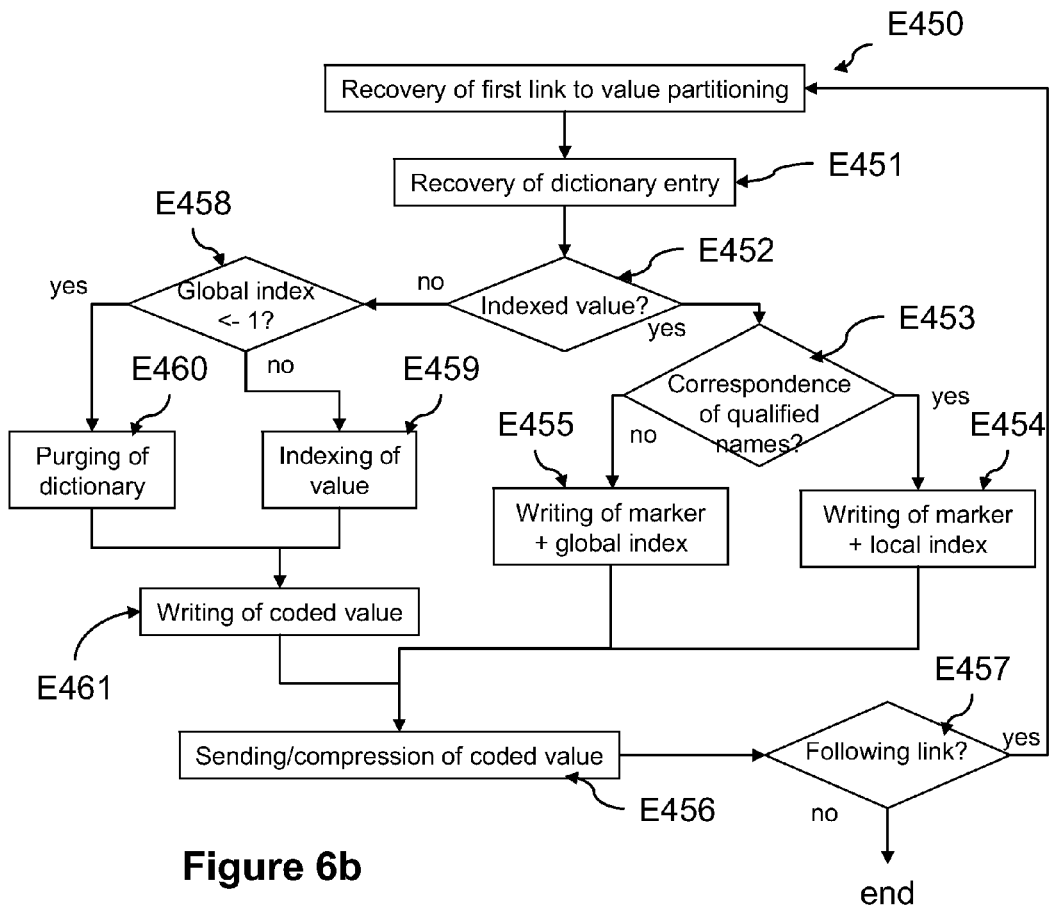

The steps of FIG. 6b generate the coding indices 42, 43 associated with each of the entries 45 in the dictionary 27 for a channel to be coded, for the purpose of producing the compressed EXI stream (when iterated for all the channels). It is then a case of the representation in the EXI sense of the strings of values contained in these channels.

According to the invention, it is an a posteriori indexing mechanism that avoids any unnecessary prior indexing processing because of the reorganization of the values in channels.

By virtue of the pre-indexing of step E303, the values appear only once in the dictionary of strings of values 27 of the coder 2.

At step E450, the bit generator 30 recovers, in the current channel to be coded, the first link to an input 45 of the dictionary 27. The input thus recovered gives access to the coded string of values 44 according to EXI, to its global index 42 and to its local index 43 as well as to a qualified name identifier (not shown and which defines the partitioning 40).

By virtue of this information, the bit generator 30 recovers at E451 the global index 42 of the string of values represented by the current entry 45.

At step E452, a test checks whether the global index of 42 is positive or zero.

If it is positive or zero, this means that the value to be coded has already been encountered and indexed. In this case, at step E453, it is checked whether the qualified name associated with this entry 45 (and therefore the qualified name defining the associated partitioning 40) is the same as the qualified name associated with the current channel of values 32.

If such is the case, the local index 43 (more compact since it is limited to the number of entries 45 in the corresponding partitioning 40) is used for coding the value.

Thus, at step E454, the local index 43 of the current entry 45 with which a marker, for example a bit, is associated, is recovered, making it possible to identify whether it is a local (rather than global) index.

This local index 43 is calculated at the first occurrence of the associated event value 41, as described below in relation to step E459.

Otherwise (output no of step E453), at step E455 the bit generator 33 recovers the global index 42 associated with the current entry 45. It adds to it a binary marker indicating "global index".

The marked value obtained at step E454 or E455 is then written, at step E456, in the compressed stream to be sent to the application 1 (the compression of the value is carried out only when the compression mode is active.

The processing next continues by considering, at step E457, the following link in the current channel of values 42, and by iterating in this way until the last link contained in the current channel of values.

On the other hand, if the test of step E452 indicates a negative global index 42 (in this case equal to −1 or −2), this means that the current value has not yet been encountered and indexed.

The test E458 makes it possible to process the two cases separately: −1 or −2.

In the case where the index 42 is equal to −1, step E459 consists of updating the current entry 45 in the dictionary of values 27 by setting the local 43 and global 42 indices equal to the indices last used, incremented by 1.

These indices are in particular stored in two counters.

The global index 42 is maintained by a first counter in the bit generator 30 for the whole of the coding dictionary 27 (starting from 0 for the first input and incremented at each new input in the dictionary).

The local index 43 is stored in a second counter, set to zero at each start of indexing of a new channel of values (step E450) and then incremented at each entry of the partitioning corresponding to the channel.

If the global index value recovered is less than −1 (output "yes" of test E458), this means that the value must not be indexed. The corresponding global index 42 is then incremented by one unit at E460 so as to take the value "−1".

On detection of this new value taken to be equal to −1, the corresponding input 45 is then deleted from the dictionary of values 27 during this same step E460.

This makes it possible not to mobilize the memory resources of the coder unnecessarily by keeping unnecessary values in the dictionary.

Following steps E459 and E460, the coded value 44 representing the string is inserted in the compressed stream at E461 before sending (E465).

This coded value 44 can then be deleted from the corresponding entry, in order to recover memory space. This is because, the following occurrences being coded by means of indices, this coded value has no further utility.

Next at step E457 the procedure as described previously is followed, until the links in the current channel of values 32 are exhausted.

Figure 7:
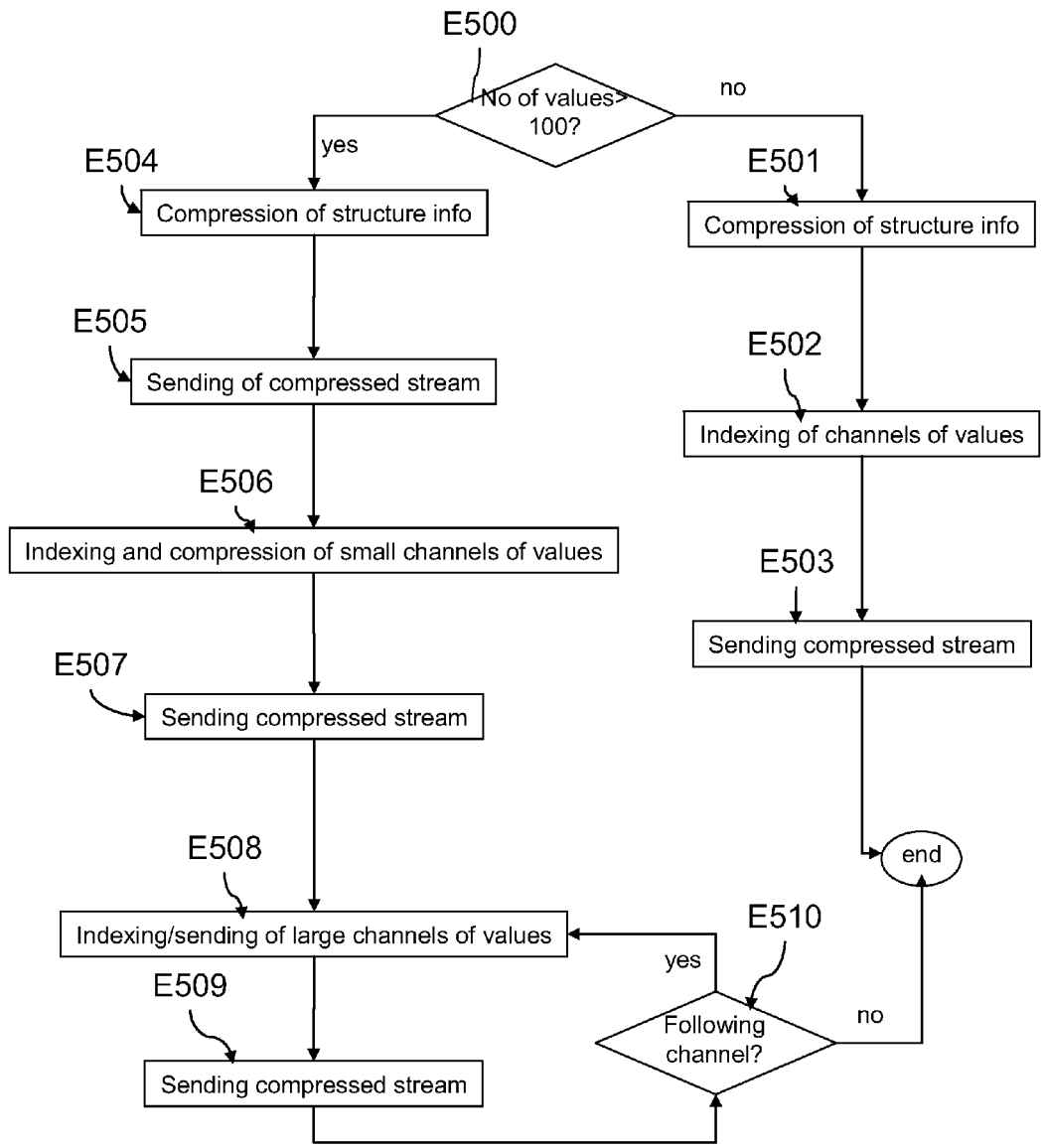
FIG. 7 illustrates, in the form of a logic diagram, steps for the coding, in "compression" mode, of a block constructed according to the teachings of the invention.

FIG. 7 shows, in the form of a logic diagram, steps for the coding in "compression" mode of a block constructed according to the teachings of the invention.

If the number of values coded for the block is less than 100 (test E500), all the values referenced in the channels of values 32 will be sent in the same compressed stream according to steps E501 to E503, indexed in the order of the channels of values 32 and concatenated with the structure information compressed at E501.

Step E501 consists, for the compressor 34, of applying the DEFLATE compression algorithm to the data contained in the structure channel 31 and storing them in the compressed EXI stream 19 in the course of construction.

The following step E502 consists of indexing all the values of the channels of values 32 according to the steps in FIG. 6b described above, keeping the order of the channels. However, in this case, during step E456, the coding value obtained is compressed by the compressor 34 and inserted in the compressed stream 19 in the course of construction.

Finally, at E503, the compressor 34 finalizes the compression of the compressed stream and the bit generator 30 sends it to the application 1. This finalization comprises in particular the adding of the information with regard to the number of values contained in the block that will be sent.

If on the other hand more than 100 values have been coded (output yes of test E500), two passes are necessary on the channels of values 32, in a similar fashion to what was described in relation to FIG. 6a.

First of all, the structure information 31 is compressed at E504 by the compressor 34, which finalizes (addition of the number of coded values in the current block) the compressed stream 19 particular to this information. This stream is then sent to the application 1 during step E505.

A first pass makes it possible to consider the channels of values 32 referencing fewer than 100 values so as to recombine them in a single channel. These channels are then run through during step E506, keeping their order of creation. Their values are then indexed and compressed according to the steps in FIG. 6b.

At step E507, the compressed stream thus obtained is transmitted to the application 1 by the bit generator 30.

The second pass iterates (steps E508 to E510) a processing operation consisting of indexing, compression and sending over the channels of values referencing more than 100 values, keeping their order of creation.

During step E508, the values referenced in a channel are indexed and compressed according to the steps of FIG. 6b.

Then, for each channel, the compressor 34 sends, at step E509, the corresponding compressed stream to the application 1. This is done until the last channel of values in the list 32 is reached (test E510).

As seen above, the invention makes it possible to dynamically adjust the size of the coding blocks to the memory constraints of the decoder. In one embodiment, provision is then made for including, at the start of each EXI stream portion corresponding to a coded block, information on the size of the block generated by the EXI coder 2 in accordance with the invention. This facilitates the decoding of the blocks.

In practice, at the start of step E309, the EXI coder 2 inserts in the bit stream generated information specifying the size of the block that follows (in terms of number of values represented in the block). This size is represented by its coding in the form of a non-signed integer. In this regard it is possible to use non-signed integer coding in accordance with the EXI specification.

To indicate to the decoder that such block size information is inserted in the stream, provision is made for using the field "blockSize" provided in the header of the bit stream 19, which is set to the value −1 in order to indicate that the block sizes are variable and indicated in the stream.

Thus, in this embodiment, an EXI decoder performing the reverse steps of the EXI coder 2 is informed about the nature of the stream that it receives and can thus consider this information relating to the size of the block before reconstructing the block in question.

This embodiment can apply to the case of a document (for example a document to the Microsoft Word format) where each page is coded as an independent element (self-contained, according to EXI terminology). In this case, the block size could correspond to the size of a page of the document to allow better memory management when this document is reconstructed and read and from a user point of view to make it possible to display the page as soon as this block is received and decoded.

The invention applies more broadly to any structured document coded and sent to an application supporting pagination. In this case, the block size can correspond to the size of a page.

For completeness of the processing, the decoding of the EXI stream 19 is carried out conventionally by the decoder when the latter is caused to process EXI streams coded in "pre-compressed" or "compressed" mode. However, instead of manipulating channels of constant size in terms of number of values in the stream, the decoder reads the value of the field "blockSize" in the header of the stream 19 in order to identify whether the blocks are of variable size.

If such is the case, the decoder proceeds with the decoding of each block by first recovering the size of the latter, in order to process the correct number of EXI events.

The decoding of each of the structure and value channels is in accordance with the EXI specification.

As is clear from the above, the present invention makes it possible to code any XML document by taking account of the memory resources of the coder or decoder or of an EXI packetizer. For this purpose, it dynamically segments the EML document into blocks (as defined by the EXI specification) of variable size according to constraints, for example memory.

The result is less consumption of the memory and more effective coding, while keeping a bit stream compatible with the EXI format.

Moreover, the invention is compatible with the EXI "bounded tables" option, which makes it possible not to index certain strings of values.

Figure 8:
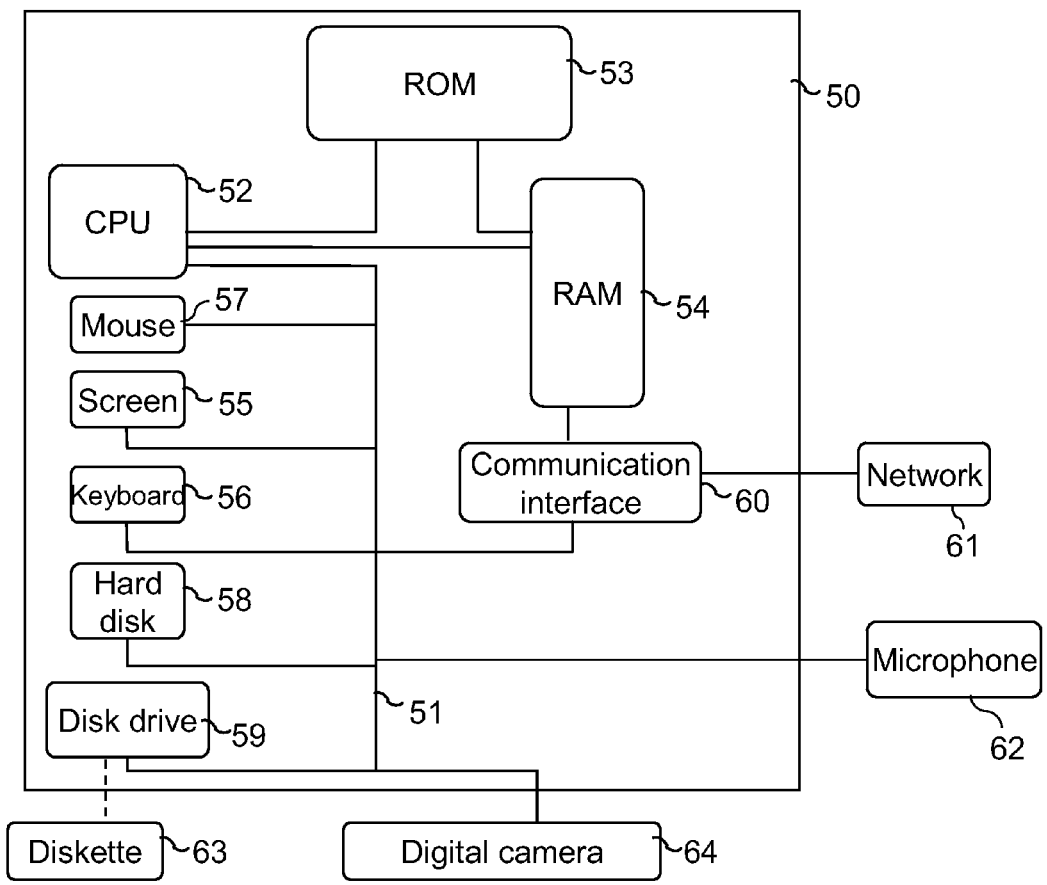
FIG. 8 shows a particular hardware configuration of a device suitable for implementing the method according to the invention.

With reference to FIG. 8, a description is now given by way of example of a particular hardware configuration of a device for coding or decoding a structured document able to implement the method according to the invention.

An information processing device implementing the invention is for example a microcomputer 50, a workstation, a personal assistant, or a mobile telephone connected to various peripherals. According to yet another embodiment of the invention, the information processing device is in the form of a photographic apparatus provided with a communication interface for enabling connection to a network.

The peripherals connected to the information processing device comprise for example a digital camera 64, or a scanner or any other image acquisition or storage means, connected to an input/output card (not shown) and supplying multimedia data to the information processing device, possibly in the form of XML documents.

The device 50 comprises a communication bus 51 to which there are connected:

a central processing unit CPU 52 in the form for example of a microprocessor;

a read only memory 53 in which the programs whose execution enables the method according to the invention to be implemented can be contained;

a random access memory 54 which, after the device 50 is powered up, contains the executable code of the programs of the invention necessary for implementing the invention;

a screen 55 for displaying data and/or serving as a graphical interface with the user, who can thus interact with the programs of the invention, by means of a keyboard 56 or any other means such as a pointing device, such as for example a mouse 57 or an optical pen;

a hard disk 58 or a storage memory, such as a memory of the compact flash type, able to contain the programs of the invention as well as data used or produced during the implementation of the invention;

an optional disk drive 59, or another reader for a removable data carrier, adapted to receive a diskette 63 and to read/write thereon data processed or to be processed according to the invention; and a communication interface 60 connected to the telecommunications network 61, the interface 60 being able to transmit and receive data.

In the case of audio data, the device 50 is preferably equipped with an input/output card (not shown) that is connected to a microphone 62.

The communication bus 51 allows communication and interoperability between the various elements included in the device 50 or connected thereto. The representation of the bus 51 is not imitative and in particular the central unit 52 is able to communicate instructions to any element of the device 50 directly or by means of another element of the device 50.

The diskettes 52 can be replaced by any information carrier such as for example a compact disc (CD-ROM), rewritable or not, a zip disk or a memory card. In general terms, an information storage means, able to be read by a microcomputer or a microprocessor, integrated or not in the device for coding or decoding a structured document, possible removable, is adapted to store one or more programs the execution of which enables the method according to the invention to be implemented.

The executable code enabling the device for coding or decoding a structured document to implement the invention can be stored either in read only memory 53, on the hard disk 58 or on a removable digital carrier such as for example a diskette 63 as described previously. According to a variant, the executable code of the programs is received by means of the telecommunication network 61, via the interface 60, in order to be stored in one of the storage means of the device 50 (such as the hard disk 58 for example) before being executed.

The central unit 52 controls and directs the execution of the instructions or portions of software code of the program or programs of the invention, the instructions or portions of software code being stored in one of the aforementioned storage means. When the device 50 is powered up, the program or programs that are stored in a non-volatile memory, for example the hard disk 58 or the read only memory 53, are transferred into the random access memory 54, which then contains the executable code of the program or programs of the invention, as well as registers for storing the variables and parameters necessary for implementing the invention.

It should also be noted that the device implementing the invention or incorporating it can also be produced in the form of a programmed apparatus. For example, such a device can then contain the code of the computer program or programs in a fixed form in an application specific integrated circuit (ASIC).

The device described here and, in particular, the central unit 52 are able to implement all or some of the processing operations described in relation to FIGS. 2 to 7, in order to implement the method that is the subject matter of the present invention and form the device that is the subject matter of the present invention.

The above examples are merely embodiments of the invention, which is not limited thereby.

The invention claimed is:

1. Method of coding a structured document comprising events to be coded having values, comprising the following steps:

running through the document in order to process the document event by event;

forming, in memory, channels of values containing values of events according to at least one criterion;

once the channels of values have been formed, coding the channels of values thus formed by coding the event values of each of these channels of values by means of at least one coding dictionary;

wherein the formation step comprises, for each event being processed and having a value, identifying an entry of the coding dictionary that associates the value of the event with a coding index, and adding this value to one of said channels of values by storing, in memory storing the channel of values, a reference to the identified entry instead of storing the event value itself, and wherein the coding of the channels includes running though each reference stored in each channel of values, using the reference run through to retrieve a coding index or a coding value from the corresponding entry of the coding dictionary, and adding the retrieved coding index or value to a coded bitstream.

2. Method according to claim 1, wherein at least one of the addings performed if a value to be added is not already there.

3. Method according to claim 2, wherein the entry added is partial in that it does not, when it is added, comprise a coding index calculated for coding a corresponding value.

4. Method according to claim 3, wherein at least one coding index of a newly added entry takes a first particular value at a time of addition.

5. Method according to claim 4, wherein the coding of the channels of values for generating at least one coded stream comprises:

the running through of said channels of values so as, in said coding dictionary, to recover a coding index for each value to be coded, by means of said reference;

replacement, in said coding dictionary, of at least one coding index associated with a reference run through, by a current index value, when this at least one coding index is equal to said first particular value.

6. Method according to claim 5, wherein an entry in the coding dictionary also comprises a coded value corresponding to literal coding of said value associated with this entry, and said coded value is deleted in said dictionary at the time of the coding, by means of the coded value, of the event value associated with said reference run through.

7. Method according to claim 5, wherein said channels of values are created as said document is run through while keeping their order of creation, and wherein, prior to said running through of the channels of values, channels among the plurality of channels of values are recombined according to at least one criterion so as to obtain at least one recombined channel of values.

8. Method according to claim 3, wherein at least one coding index of a newly added entry takes a second particular value at a time of addition, so as to indicate that the subsequent occurrences of the event value are not encoded by means of an index.

9. Method according to claim 8, wherein the channel coding step comprises the addition of a predetermined value to the at least one coding index of the entry associated with a reference of a channel to be coded, when this entry comprises initially a coding index equal to the second particular value, and the deletion, in the coding dictionary, of this entry, when this coding index becomes equal to the first particular value.

10. Method according to claim 1, wherein said channels of values are created as said document is run through while keeping their order of creation.

11. Method according to claim 1, comprising, for each association of a value with a channel of values, the following steps:
    estimating a number of bits necessary for coding said event value;
    increasing a bit counter by said estimated number of bits;
    using said bit counter for dividing said structured document into a plurality of data blocks to be coded separately.

12. Method according to claim 11, wherein the estimated number of bits is equal to the number of bits necessary for representing the number, increased by one, of entries in said coding dictionary.

13. Method according to claim 11 or 12, wherein the formation of the channels is stopped and they are coded when said bit counter reaches a predefined value so as to generate at least one coded stream corresponding to a part of the document.

14. Method according to claim 13, wherein generation of the at least one coded stream is iterated according to the predefined value, for coding a plurality of successive parts of the structured document.

15. Non-transitory information storage means, at least partially removable, able to be read by a computer system, comprising instructions for a computer program adapted to implement the coding method according to claim 1, when the program is loaded into and executed by the computer system.

16. Computer program product stored in a non-transitory computer readable medium and able to be read by a microprocessor, comprising portions of software, adapted to implement the coding method according to claim 1, when it is loaded into and executed by the microprocessor.

17. Device for coding a structured document comprising events to be coded having values, comprising:
    a means able to run through the document in order to process the document event by event;
    a means of forming, in memory, channels of values containing values of events according to at least one criterion;
    a means of, once the channels of values have been formed, coding the channels of values thus formed by coding the event values of each of these channels of values by means of at least one coding dictionary;
    wherein said formation means is able to identify, for each event being processed and having a value, an entry of the coding dictionary that associates the value of the event with a coding index, and add this value to one of said channels of values by storing, in memory storing the channel of values, a reference to the identified entry instead of storing the event value itself, and
    wherein the coding of the channels by the means of coding includes running though each reference stored in each channel of values, using the reference run through to retrieve a coding index or a coding value from the corresponding entry of the coding dictionary, and adding the retrieved coding index or value to a coded bitstream.

* * * * *